(12) United States Patent
Bykans et al.

(10) Patent No.: US 9,689,308 B2
(45) Date of Patent: Jun. 27, 2017

(54) THROTTLE VALVE ASSEMBLY (75) Inventors: Gerald Bykans, St. Marceau (FR);
Hugues Simion, Rehon (FR)

(73) Assignee: DELPHI INTERNATIONAL OPERATIONS LUXEMBOURG S.A.R.L, Luxembourg (LU)

( * ) Notice: Subject to any disclaimer, the term of this patent is extended or adjusted under 35 U.S.C. 154(b) by 477 days.

(21) Appl. No.: 14/003,471

(22) PCT Filed: Jan. 9, 2012

(86) PCT No.: PCT/EP2012/050250
§ 371 (c)(1),
(2), (4) Date: Sep. 25, 2013

(87) PCT Pub. No.: WO2012/119797
PCT Pub. Date: Sep. 13, 2012

(65) Prior Publication Data
US 2014/0007835 A1   Jan. 9, 2014

(30) Foreign Application Priority Data
Mar. 8, 2011   (EP) .................................. 11157259

(51) Int. Cl.
*F01L 7/00* (2006.01)
*F02B 77/00* (2006.01)
(Continued)

(52) U.S. Cl.
CPC .......... *F02B 77/00* (2013.01); *F02B 29/0418* (2013.01); *F02D 9/105* (2013.01); *F02D 9/1065* (2013.01); *F02M 26/10* (2016.02); *F02M 26/48* (2016.02); *F02M 26/64* (2016.02); *F02M 26/70* (2016.02); *F02M 35/10255* (2013.01); *F16K 11/0525* (2013.01); *F16K 11/22* (2013.01);
(Continued)

(58) Field of Classification Search
USPC .......................... 123/336, 337, 442, 583, 584
See application file for complete search history.

(56) References Cited

U.S. PATENT DOCUMENTS 4,094,285 A    6/1978  Oyama et al.
2003/0010314 A1  1/2003  Brosseau et al.
(Continued)

FOREIGN PATENT DOCUMENTS

EP   1 103 715 A1   5/2001
EP   2 085 601 A1   8/2009
(Continued)

OTHER PUBLICATIONS

International Search Report dated Feb. 14, 2012.

*Primary Examiner* — Hung Q Nguyen
*Assistant Examiner* — Ruben Picon-Feliciano
(74) *Attorney, Agent, or Firm* — Joshua M. Haines (57) ABSTRACT

A throttle valve assembly includes a valve housing having a main channel and an auxiliary channel. A main throttle valve is pivotally mounted in the main channel, and an auxiliary throttle valve pivotally is mounted in the auxiliary channel. A common rotating actuator controls the opening angle of both the main throttle valve and the auxiliary throttle valve through an actuating mechanism. The actuating mechanism includes a crank mechanism connected between an auxiliary pivoting shaft and a gear train driven by the rotating actuator.

14 Claims, 7 Drawing Sheets

(51) Int. Cl.
*F02B 29/04* (2006.01)
*F02D 9/10* (2006.01)
*F02M 35/10* (2006.01)
*F16K 11/052* (2006.01)
*F16K 11/22* (2006.01)
*F02M 26/48* (2016.01)
*F02M 26/10* (2016.01)
*F02M 26/64* (2016.01)
*F02M 26/70* (2016.01)
F02D 9/02 (2006.01)
F02M 26/05 (2016.01)

(52) U.S. Cl.
CPC ............... *F02D 2009/0262* (2013.01); *F02D 2009/0264* (2013.01); *F02M 26/05* (2016.02); *Y02T 10/146* (2013.01)

(56) References Cited

U.S. PATENT DOCUMENTS

| | | |
|---|---|---|
| 2005/0241702 A1 | 11/2005 | Blomquist et al. |
| 2008/0184958 A1* | 8/2008 | Sato et al. .................... 123/336 |
| 2008/0216794 A1* | 9/2008 | Kuji et al. ..................... 123/336 |
| 2009/0050830 A1* | 2/2009 | Albert et al. ............. 251/129.11 |
| 2010/0026274 A1 | 2/2010 | Chang et al. |
| 2011/0023846 A1 | 2/2011 | Miyazaki et al. |

FOREIGN PATENT DOCUMENTS

| | | |
|---|---|---|
| EP | 2 317 111 A1 | 5/2011 |
| FR | 2 926 126 A1 | 7/2009 |

* cited by examiner

THROTTLE VALVE ASSEMBLY

CROSS REFERENCE TO RELATED APPLICATIONS

This application is a national stage application under 35 U.S.C. 371 of PCT Application No. PCT/EP2012/050250 having an international filing date of Jan. 9, 2012, which designated the U.S., which PCT application claimed the benefit of European Patent Application No. 11157259.0 filed Mar. 8, 2011, the entire disclosure of each of which are hereby incorporated herein by reference.

TECHNICAL FIELD

The present invention relates generally to throttle valve assemblies to be arranged in the intake air channel of an internal combustion engine.

BACKGROUND OF THE INVENTION

The present invention relates more particularly to a throttle valve assembly comprising:
- a valve housing having a main channel and an auxiliary channel connected to the main channel,
- a main throttle valve pivotally mounted in the main channel between a fully open position and a closed position, said main throttle valve having a main pivoting shaft extending along a main axis,
- an auxiliary throttle valve pivotally mounted in the auxiliary channel between a closed position and a fully open position, said auxiliary throttle valve having an auxiliary pivoting shaft extending along an auxiliary axis,
- a common rotating actuator controlling the opening angle of both the main throttle valve and the auxiliary throttle valve.

An example of such a throttle valve assembly is disclosed in document US2005/0241702A1.

The present invention aims at improving existing solutions by providing an assembly which allows independently a better control of the pivoting movement of each throttle valve and which is more compact. It is intended to provide a solution more reliable and easier to design depending on the needs in connection with the specific application.

SUMMARY OF THE INVENTION

In order to solve the above mentioned problems, the present invention provides a throttle valve assembly for an internal combustion engine comprising:
- a valve housing having a main channel and an auxiliary channel connected to the main channel,
- a main throttle valve pivotally mounted in the main channel between a fully open position and a closed position, said main throttle valve having a main pivoting shaft extending along a main axis,
- an auxiliary throttle valve pivotally mounted in the auxiliary channel between a closed position and a fully open position, said auxiliary throttle valve having an auxiliary pivoting shaft extending along an auxiliary axis,
- a common rotating actuator controlling the opening angle of both the main throttle valve and the auxiliary throttle valve through an actuating mechanism, said actuating mechanism providing a time shift between the pivoting motions of both throttle valves during actuation of the rotating actuator, characterized by said actuating mechanism comprising a crank mechanism connected between the auxiliary pivoting shaft and a gear train driven by the rotating actuator such that, depending on the rotational motion provided by the rotating actuator, successively the auxiliary throttle valve is first actuated from its closed position to its fully open position and secondly actuated from its fully open position to its closed position, without need for reversing the rotation direction of the rotating actuator.

The throttle valve assembly according to the invention allows time shifting between the main throttle valve and the auxiliary throttle valve and allows in parallel to the closing of the main throttle valve opening and closing of the auxiliary valve without need for reversing the rotation direction of the rotating actuator.

Thanks to the features of the invention, it is easier to adapt the throttle valve assembly to the context of the application by adjusting the design of the crank mechanism.

Such a throttle valve assembly can be used in the intake air channel of the internal combustion engine. The auxiliary throttle valve can be used for example to meter hot air coming from the turbocharger or to meter recirculated exhaust gas.

Advantageously, the respective axes of the rotating actuator, of the main throttle valve and of the auxiliary throttle valve are parallel but not coaxial which provides a more compact and more flexible arrangement of the actuating mechanism in the valve housing.

According to other advantageous features of the invention:
- said crank mechanism comprises a crank attached to the auxiliary shaft and controlled by a lever connected to the gear train;
- said actuating mechanism comprises a rotary phase shifter mechanism mounted on the main shaft and connected to the rotating actuator through a gear train such that, depending on the rotational motion provided by the rotating actuator, successively the main throttle valve is first actuated from its fully open position to its closed position and secondly maintained in its closed position until the auxiliary throttle valve goes back to its closed position;
- said rotary phase shifter mechanism comprises a first pivoting member rotatably driven by the gear train and a connecting spring fitted in between the main shaft and the first pivoting member such that, depending on the rotational motion provided by the rotating actuator, successively the first pivoting member rotates and engages the connecting spring, driving the main shaft in rotation together with the main throttle valve which rotates from its fully open position to its closed position, and then the first pivoting member rotates with regards to the main shaft, loading the connecting spring, the main throttle valve remaining in its closed position;
- a toothed sector is made of one piece with the first pivoting member said toothed sector meshing with said gear train;
- said rotary phase shifter mechanism comprises a second pivoting member connected in a rotationally rigid manner to the main shaft, a supplementary toothed sector being attached to the second pivoting member, said supplementary toothed sector meshing with said gear train only from the fully open position to the fully closed position of the main throttle valve;

said second pivoting member has an abutment surface and said first pivoting member has a stop surface, said connecting spring biasing the abutment surface towards the stop surface;

said rotary phase shifter mechanism comprises an arrangement allowing the main throttle valve to remain in its fully open position while the auxiliary throttle valve is actuated from its closed position to an intermediate open position by the rotating actuator;

said connecting spring has a first end connected with a rotational shift to the first pivoting member and a second end connected in a rotationally rigid manner to the main shaft such that, depending on the rotational motion provided by the rotating actuator, the first pivoting member is able to rotate without engaging the connecting spring, the main throttle valve remaining in its fully open position;

said rotary phase shifter mechanism comprises a second pivoting member connected in a rotationally rigid manner to the main shaft, said first and said second pivoting members having substantially complementary tubular shapes coaxial with the main axis, said second pivoting member being received into said first pivoting member and said connecting spring being mounted in the tubular housing defined by said first and second pivoting members, said connecting spring second end being attached to said second pivoting member, and said first pivoting member having a notch in its tubular surface for engaging said connecting spring first end with a rotational shift;

said crank mechanism is hinged on said first pivoting member;

an angular sensor is arranged on the valve housing and cooperates with a rotating part arranged on said first pivoting member;

at least one return spring biases the main throttle valve towards its fully open position and biases the auxiliary throttle valve towards its closed position;

said main axis is substantially parallel to said auxiliary axis.

BRIEF DESCRIPTION OF THE DRAWINGS

The present invention is now described by way of example with reference to the accompanying drawings in which.

DESCRIPTION OF THE PREFERRED EMBODIMENTS

In the following description, elements which are similar or identical may be designated with the same reference number. An orientation according to the reference system V, L, T corresponding to a Vertical, a Longitudinal, and a Transverse direction, as shown on the figures, will be used with a non limitative purpose.

Figure 1:
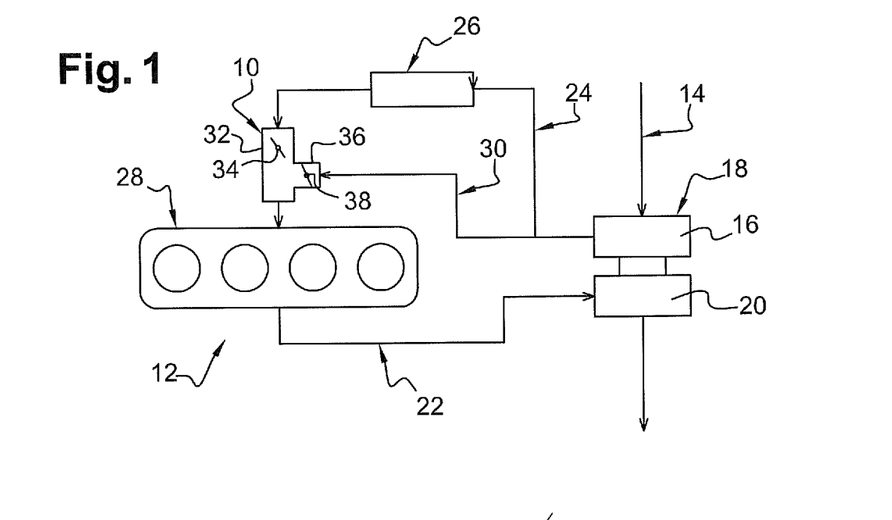
FIG. 1 is a schematic view of an internal combustion engine incorporating a throttle valve assembly in accordance with the present invention having a main throttle valve and an auxiliary throttle valve.
Figure 2:
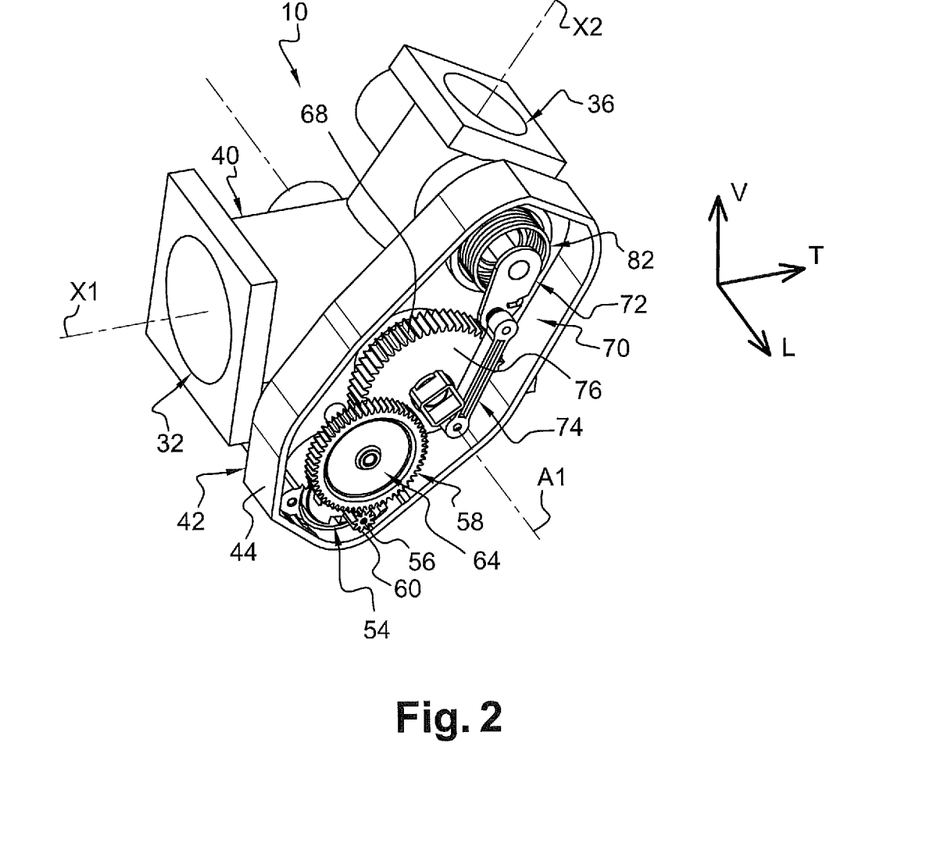
FIG. 2 is a perspective view of the throttle valve assembly of FIG. 1 showing the actuating mechanism controlling the main and auxiliary throttle valves according to a first embodiment of the present invention.
Figure 3:
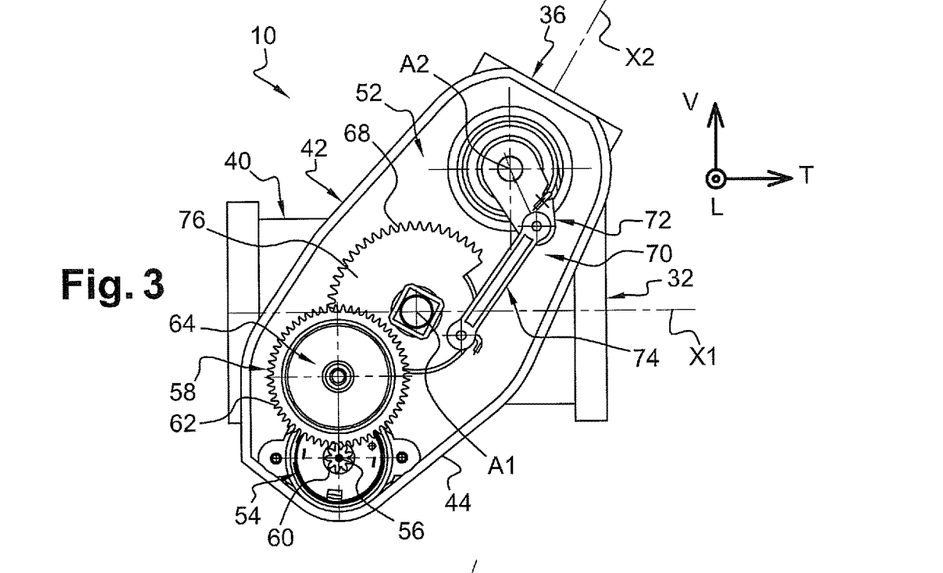
FIG. 3 is a side view of the throttle valve assembly of FIG. 2.

FIG. 1 shows an example of implementation of a throttle valve assembly 10, also called three way valve assembly, in a turbocharged internal combustion engine 12. According to this example, the engine 12 comprises an intake air channel 14 which is connected to the compressor side 16 of a turbocharger 18, the turbine side 20 of the turbocharger 18 being connected to an exhaust gas channel 22 of the engine 12. Compressed air exits the compressor side 16 of the turbocharger 18 through an inlet channel 24 and flows successively through an intercooler device 26 to be cooled down and through the throttle valve assembly 10 before being admitted into an engine block 28. Upstream of the intercooler device 26, the inlet channel 24 includes a deviation forming a by-pass channel 30 which is connected to the throttle valve assembly 10 in order to by-pass the intercooler device 26. This by-pass channel 30 aims at providing selectively an amount of warmer air to the engine 10.

The throttle valve assembly 10 comprises a main channel 32 which is provided with a main throttle valve 34 for metering the intake air flow provided to the engine 10, and an auxiliary channel 36 provided with an auxiliary throttle valve 38, said auxiliary channel 36 being connected to the main channel 32 downstream with regards to the main throttle valve 34 such that it can provide intake air flow to the engine 10 even when the main throttle valve 34 is closed.

An example of throttle valve assembly 10 according to the teaching of the invention, and according to a first embodiment of the invention, is shown on FIGS. 2 to 5 and 9 to 11. It comprises a valve housing 40 defining the main channel 32 extending along a transverse axis X1, the auxiliary channel 36 extending along an axis X2 intersecting with the transverse axis X1 in a vertical plane, and a control mechanism housing 42 delimited by longitudinal peripheral walls 44. In the present example, the main channel 32 and the auxiliary channel 36 intersect according to an angle of about 60 degrees. Of course, alternative embodiments encompass various possible angles between the two axes X1, X2 including an angle wherein both channels 32, 36 are orthogonal.

The control mechanism housing 42 is designed to be closed by a removable cover (not shown).

Figure 4:
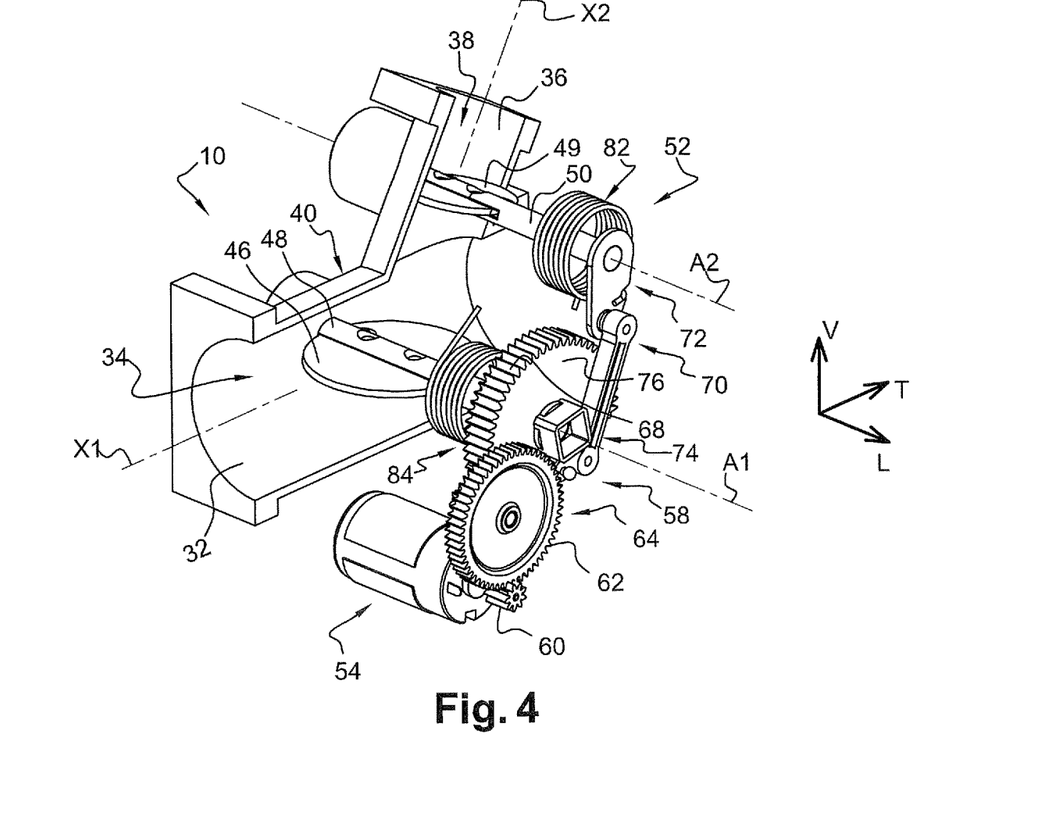
FIG. 4 is a perspective view of the throttle valve assembly of FIG. 2 wherein the valve housing is partially cut.
Figure 5:
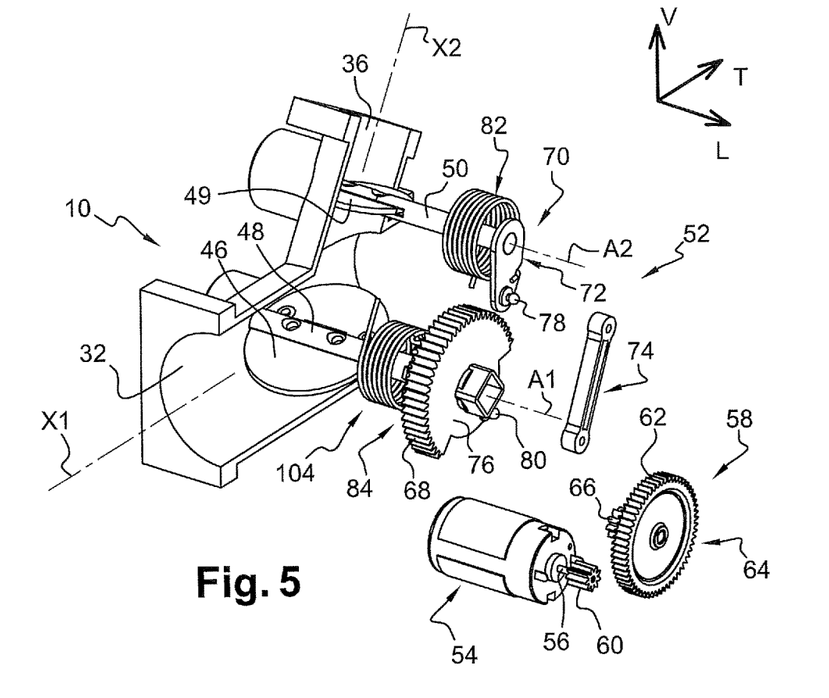
FIG. 5 is an exploded view of the throttle valve assembly of FIG. 2 wherein the valve housing is partially cut.
Figure 6:
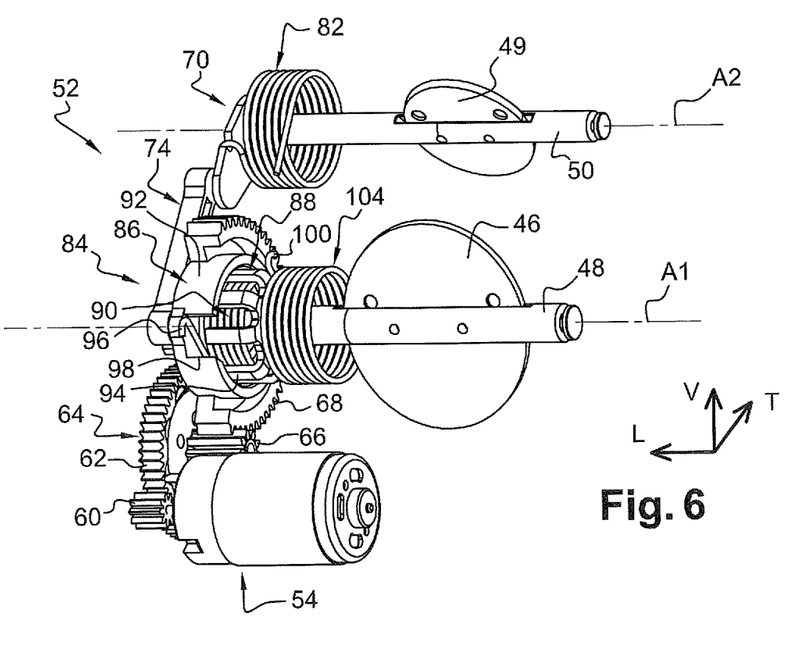
FIG. 6 is a perspective view of the actuating mechanism of FIG. 2 showing a rotary phase shifter mechanism mounted on the main shaft of the main throttle valve.
Figure 7:
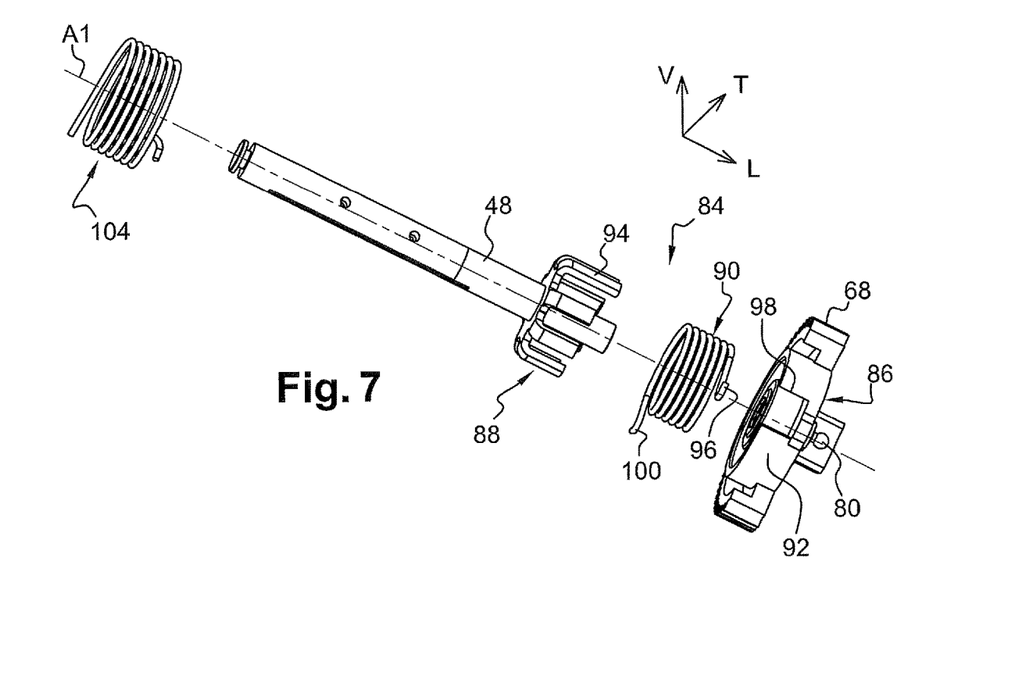
FIG. 7 is an exploded view of the rotary phase shifter mechanism of FIG. 6.

The main throttle valve 34 comprises a main flap 46 which is rigidly connected to a main pivoting shaft 48 pivotally mounted in the main channel 32 about a main axis A1, between a fully open position MV1, which is shown on FIG. 4, and a closed position MV2.

Figure 9:
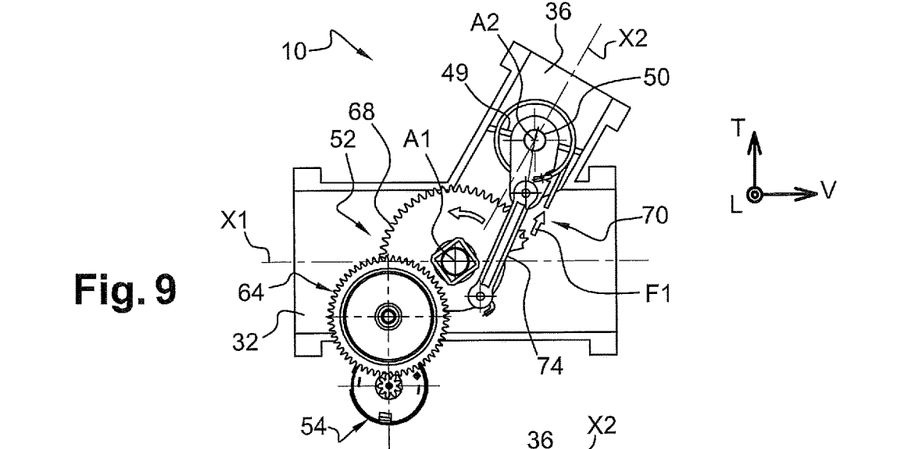
FIG. 9 is a side view of the actuating mechanism of FIG. 2 illustrating a first stage of the operation of the throttle valve assembly wherein the main throttle valve is fully open and the auxiliary throttle valve is closed.
Figure 10:
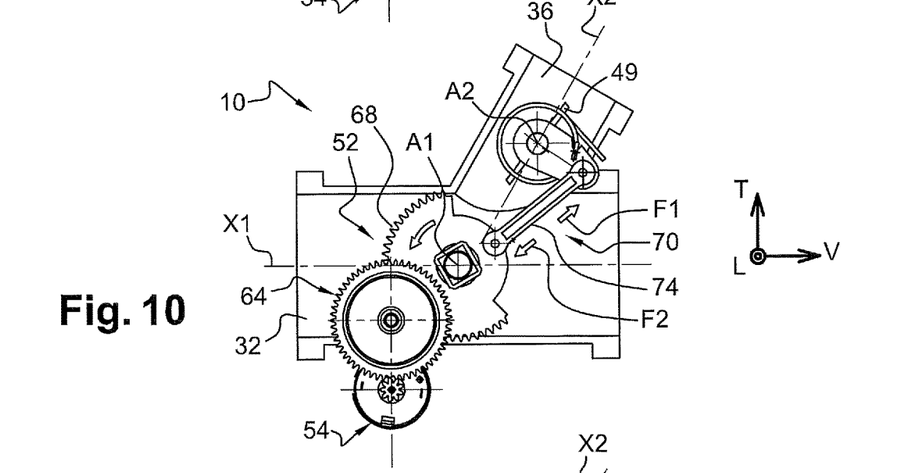
FIG. 10 is a similar view to FIG. 9 illustrating a third stage of the operation of the throttle valve assembly wherein the main throttle valve is closed and the auxiliary throttle valve is fully open.
Figure 11:
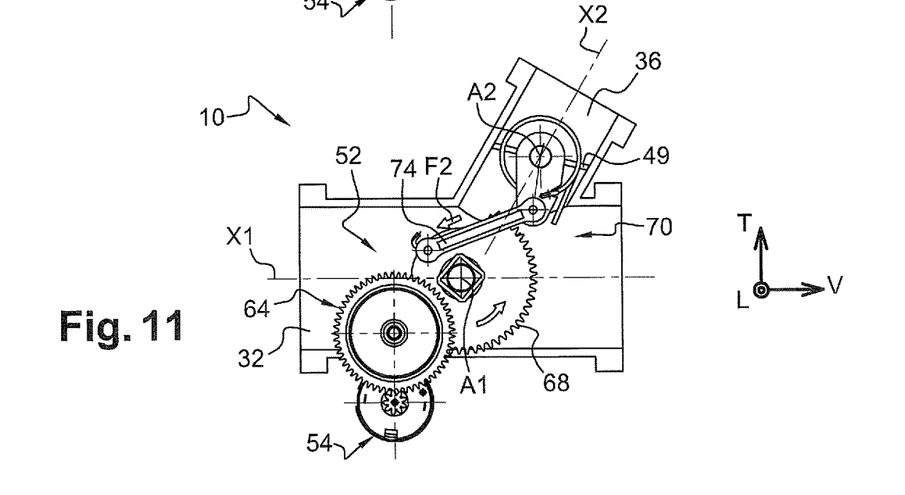
FIG. 11 is a similar view to FIG. 9 illustrating a fourth stage of the operation of the throttle valve assembly wherein both throttle valves are closed.

The auxiliary throttle valve 38 comprises an auxiliary flap 49 which is rigidly connected to an auxiliary pivoting shaft 50 pivotally mounted in the auxiliary channel 36 about an auxiliary axis A2, between a fully closed position AV1, which is shown on FIGS. 4, 9 and 11, and a fully open position AV2, which is shown on FIG. 10.

The main pivoting shaft 48 and the auxiliary pivoting shaft 50 extend inside the control mechanism housing 42 where they are coupled to an actuating mechanism 52 controlled by a single rotating actuator 54. The rotating actuator 54 is constituted of an electric rotary motor having a driving shaft 56 parallel to the main axis A1 and the auxiliary axis A2.

According to the embodiment shown, the actuating mechanism 52 comprises a gear train 58 having a driving pinion 60 mounted on the driving shaft 56 of the rotating actuator 54, said driving pinion 60 meshing with a first set of teeth 62 of an intermediate gear member 64. A second set of teeth 66 of said intermediate gear member 64 meshes with a toothed sector 68 axially rotated on the main pivoting shaft 48 in order to control the opening angle of both the main throttle valve 34 and the auxiliary throttle valve 38.

As can be seen more particularly on FIGS. 3 to 6, the actuating mechanism 52 comprises a crank mechanism 70 which is connected between the auxiliary pivoting shaft 50 and the toothed sector 68. A crank 72 is attached to the auxiliary shaft 50 and controlled by a lever 74 connected to a radial surface 76 of the toothed sector 68. The lever 74 is articulated at each extremity on a corresponding pin 78, 80 respectively provided on the crank 72 and on the radial surface 76.

The radial position of the pin 80 on the toothed sector 68 and the radial position of the pin 78 on the crank 72 are chosen, together with the length of the lever 74, in order to provide an alternative movement of the auxiliary throttle valve 38 between its closed position AV1 and its fully open position AV2, depending on the rotational position of the toothed sector 68.

A first return spring 82 is mounted around the auxiliary shaft 50, a first of its ends being attached to an extremity of the crank 72 and a second of its ends being connected in a rotationally rigid manner to the valve housing 40, such that said first return spring 82 biases the auxiliary throttle valve 38 towards its closed position AV1.

As can be seen more particularly on FIGS. 4 to 7, the actuating mechanism 52 comprises a rotary phase shifter mechanism 84 mounted on the main shaft 48 and connected to the gear train 58. According to the first embodiment of the throttle valve assembly 10 shown, said rotary phase shifter mechanism 84 comprises a first pivoting member 86 rotatably driven by the gear train 58, a second pivoting member 88 attached to the main shaft 48, and a connecting spring 90 fitted in between the first pivoting member 86 and the second pivoting member 88.

Advantageously, said first pivoting member 86 is made of one piece with the toothed sector 68.

In the first embodiment shown, first and second pivoting members 86, 88 have complementary tubular shapes 92, 94 coaxial with the main axis A1. More particularly, the second pivoting member tubular shape 94 is made of axial strips defining a tubular housing for receiving said connecting spring 90.

Said connecting spring 90, preferably a compression spring coaxial to the main axis A1, has a first end 96 cooperating with a corresponding notch 98 provided in the first pivoting member tubular shape 92. A second end 100 of the connecting spring 90 is attached to the second pivoting member 88 such that relative rotation of the first pivoting member 86 with regards to the second pivoting member 88 loads the connecting spring 90. Here the second end 100 of the connecting spring 90 is inserted and retained in a slit delimited by two adjacent strips of the second pivoting member tubular shape 94.

The notch 98 allows the first pivoting member 86 to engage the connecting spring 90 with a rotational shift such that a first portion of the rotational motion of the first pivoting member 86 does not lead to a corresponding rotational motion of the main shaft 48. Thanks to the arrangement of the connecting spring 90 between first and second pivoting members 86, 88, the main throttle valve 34 remains in its fully open position MV1 while the auxiliary throttle valve 38 is actuated from its closed position AV1 to an intermediate open position AV3 by the rotating actuator 54.

A second return spring 104 is mounted around the main shaft 48, a first of its ends being attached to the second pivoting member tubular shape 94 and a second of its ends being connected in a rotationally rigid manner to the valve housing 40, such that said second return spring 104 biases the main throttle valve 34 towards its fully open position MV1.

Figure 8:
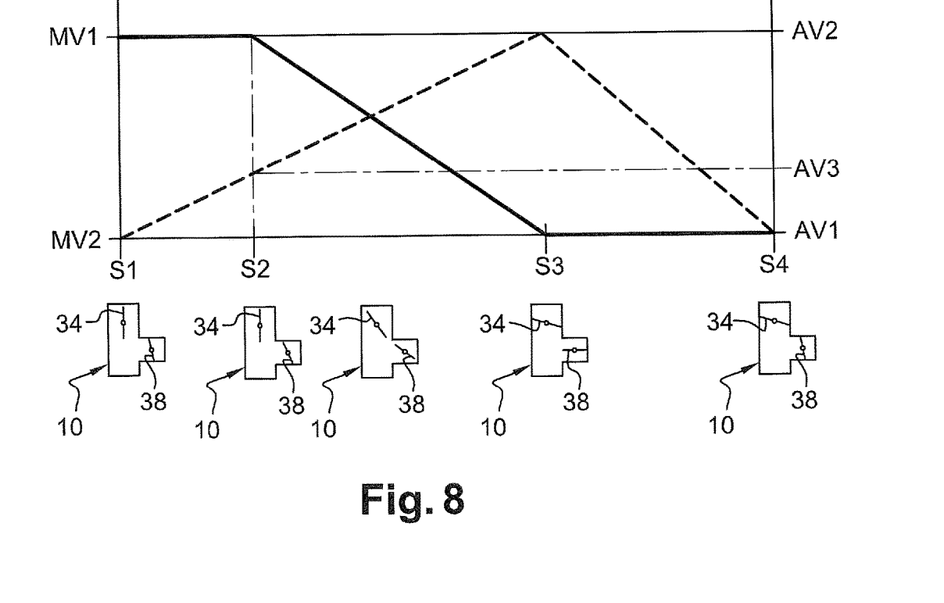
FIG. 8 is a diagram illustrating in four different stages the operation of the throttle valve assembly of FIG. 2, each stage being illustrated by a schematic view of the throttle valve assembly.

Referring now to FIGS. 8 to 11, in connection with the previous figures, the operation of the above described throttle valve assembly 10, according to its first embodiment, will be described in detail. The diagram of FIG. 8 represents, from left to right, various positions of the main throttle valve 34 (continuous line) and auxiliary throttle valve 38 (dashed line) depending on the rotational motion provided by the rotating actuator 54, from a first stage S1, on the left, wherein the rotating actuator 54 is unpowered to a fourth stage S4, on the right, wherein the rotating actuator 54 is fully powered. The bottom side of the diagram corresponds to a closed state of the corresponding throttle valve 34, 38 and the upper side of the diagram corresponds to a fully open state of the corresponding throttle valve 34, 38.

Additionally, below the diagram are represented various states of the throttle valve assembly 10 corresponding to the different stages.

When the rotating actuator 54 is switched off (first stage S1), both throttle valves 34, 38 are biased in their rest states by the corresponding return springs 82, 104, in a fully open position MV1 for the main throttle valve 34 and in a closed position AV1 for the auxiliary throttle valve 38.

Starting from the first stage S1 shown on FIG. 9, the driving pinion 60 is rotated by the rotating actuator 54 until a second stage S2, in a counter clockwise direction considering FIG. 9, causing the intermediate gear member 64 to rotate in a clockwise direction. Rotation of the intermediate gear member 64 makes the toothed sector 68 rotating in a counter clockwise direction, from a first angular position shown on FIG. 9 to an intermediate angular position. Said rotation of the toothed sector 68 moves the lever 74 in the direction of the arrow F1, causing the auxiliary shaft 50 to rotate in the clockwise direction and the auxiliary flap 49 to pivot in a partially open position AV3.

According to the first embodiment shown, said second stage S2 corresponds to a still fully open position MV1 of the main throttle valve 34. From the first stage S1 to the second stage S2, rotation of the first pivoting member 86 together with the toothed sector 68 is independent of the rotation of the main shaft 48 because of the notch 98 which allows relative rotation between the first pivoting member 86 and the first end 96 of the connecting spring 90.

The first pivoting member 86 engages the first end 96 of the connecting spring 90 at the second stage S2 such that, by further rotating the rotating actuator 54, from the second stage S2 to a third stage S3, further rotation of the toothed sector 68 provides corresponding rotation of the second pivoting member 88 together with the main shaft 48 which loads the second return spring 104. Stiffness of said connecting spring 90 is chosen to be higher than the biasing force (stiffness of the second return spring 104) driving the main throttle valve 34 towards its fully open position MV1 such that rotation of the first pivoting member 86 causes corresponding rotation of the second pivoting member 88 substantially without compression of the connecting spring 90.

From the second stage S2 to the third stage S3, as can be seen on FIG. 8, rotation of the rotating actuator 54 provides simultaneously pivoting of the auxiliary flap 49 from its partially open position AV3 to its fully open position AV2 and pivoting of the main flap 46 from its fully open position MV1 to its closed position MV2.

Between the second stage S2 and the third stage S3, there are intermediate stages wherein both flaps 46, 48 are partially opened.

In the third stage S3, the lever 74 reaches a "peak position", which is shown on FIG. 10, wherein it cannot drive the auxiliary shaft 50 in the clockwise direction anymore. Thus, further rotation of the rotating actuator 54, from the third stage S3 to the fourth stage S4, causes the lever 74 to swing in an opposite direction F2, with regards to the main shaft 50, driving the main shaft 48 in a counter clockwise direction such that the auxiliary flap 49 pivot from its fully open position AV2 to its closed position AV1 shown on FIG. 11.

From the third stage S3, as the main flap 46 is in its closed position MV2, further rotation of the rotating actuator 54 provides further rotation of the first pivoting member 86 with regards to the second pivoting member 88 which is blocked in rotation. Such a relative rotation between both pivoting members 86, 88 loads the connecting spring 90.

At the fourth stage S4, switching off the rotating actuator 54 causes both throttle valves 34, 38 to come back to their respective rest positions MV1, AV1 thanks to the biasing force applied by both return springs 82, 104 to the actuating mechanism 52. Under this biasing force, the gear train 58 is rotated in a rotational direction opposite to the one provided by actuation of the rotating actuator 54. For example, said toothed sector 68 is rotated in a clockwise direction from the fourth stage S4 shown on FIG. 11 to the first stage S1 shown on FIG. 9.

As an alternative embodiment (not shown), closing of the main throttle valve 34 could start at the first stage S1, as soon as the rotating actuator 54 starts to rotate, and the intermediate second stage S2 would be omitted. This would require removing the notch 98 and attaching rigidly the connecting spring first end 96 to the first pivoting member 86.

A second embodiment of the throttle valve assembly according to the teaching of the invention is represented on FIGS. 12 to 15. In the following description, only the main differences between first and second embodiments will be detailed. The second embodiment differs from the first one mainly thanks to the intermediate second stage S2 which has been omitted, as suggested for the alternative embodiment mentioned above, and thanks to a different rotary phase shifter mechanism 84. As for the rest, most of the features of the throttle valve assembly 10 remain substantially the same and same reference numbers will be used.

In the second embodiment, the notch 98 has been removed and a supplementary toothed sector 106 has been provided on the second pivoting member 88. Preferably, the supplementary toothed sector 106 is made of one piece with the tubular shape 94 of the second pivoting member 88. Advantageously, the second pivoting member 88 has an abutment surface 108 which comes into abutment against a corresponding stop surface 110 provided on the first pivoting member 86. The connecting spring 90 biases the second pivoting member 88 towards the stop surface 110 such that, at the first stage S1, the second set of teeth 66 of the intermediate gear member 64 engages both with the toothed sector 68 and with the supplementary toothed sector 106. In order to cope with manufacturing tolerances, the assembly may be arranged such that the second set of teeth 66 of the intermediate gear member 64 engages first with the supplementary toothed sector 106, the rotating force being transmitted to the toothed sector 68 through the connecting spring 90.

Thus, at the beginning of the rotational motion of the gear train 58, when the rotating actuator 54 starts to rotate, the first pivoting member 86 with the toothed sector 68 and the second pivoting member 88 with the supplementary toothed sector 106 start to rotate simultaneously. It causes at the same time the main throttle valve 34 to start closing and the auxiliary throttle valve 38 to start opening, as can be seen on the diagram of FIG. 15 from the first stage S1 to the third stage S3.

The supplementary toothed sector 106 has the same teeth pitch as the toothed sector 68, to engage with the second set of teeth 66 of the intermediate gear member 64, but it has a shorter circumferential dimension. The circumferential dimension of the supplementary toothed sector 106 is chosen to correspond to the angular motion of the main throttle valve 34 from its fully open position MV1 to its fully closed position MV2.

Thus, when the rotation of the intermediate gear 66 reaches the end of the supplementary toothed sector 106 the main throttle valve 34 is in its fully closed position MV2 and the second pivoting member 88 stops rotating, which correspond to the third stage S3. Because it is not the end of the toothed sector 68, further rotation of the intermediate gear 66 causes further rotation of the first pivoting member 86, loading the connecting spring 90 from the third stage S3 to the fourth stage S4, as it was the case in the first embodiment of the invention.

As it is the case for the first embodiment, the second pivoting member 88 is attached to the main shaft 48 and spring loaded to the valve housing 40 thanks to the second return spring 104. The first pivoting member 86 is free of rotation with regards to the main shaft 48 and spring loaded with regards to the second pivoting member 88 thanks to the connecting spring 90. First and second pivoting members 86, 88 are clocked thanks to the abutment surface 108 and the stop surface 110.

Between the first stage S1 and the third stage S3 of the actuation (FIG. 15), the intermediate gear 64 engages the first and second pivoting members 86, 88 leading to the rotation of the main throttle valve 34. There is no relative motion between the first pivoting member 86 and the second pivoting member 88 ensuring right, accurate, and reliable control of the main throttle valve 34 angular position. Thanks to this arrangement, it is possible to control the actuating mechanism 52 with only one angular sensor 114 sensing the angular position of the first pivoting member 86.

Figure 12:
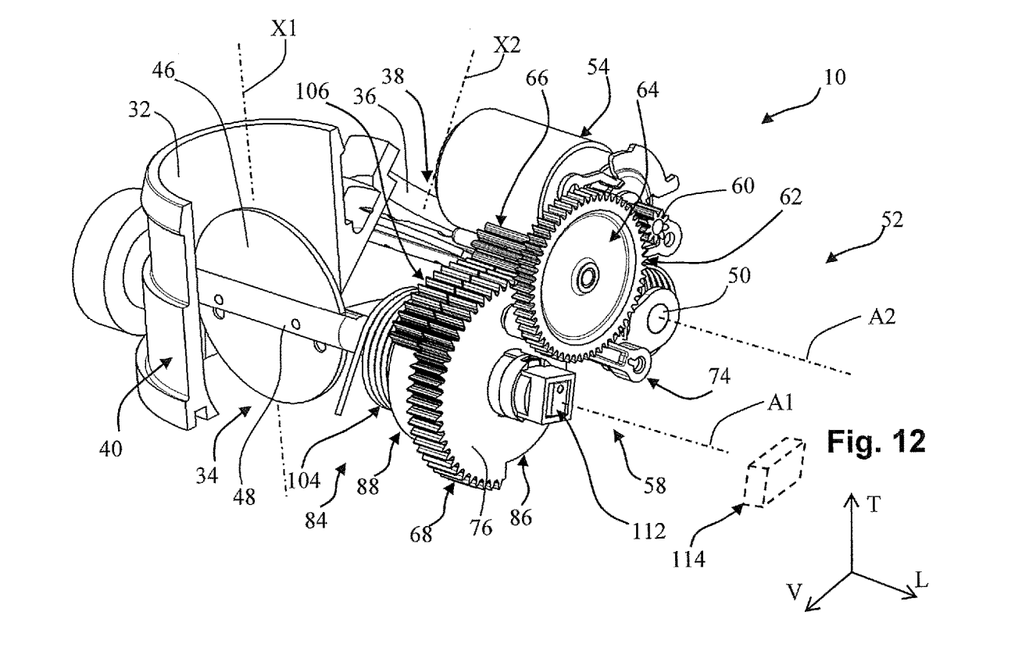
FIG. 12 is a similar view to FIG. 4 showing the actuating mechanism of a throttle valve assembly according to a second embodiment of the invention having a different rotary phase shifter mechanism.
Figure 13:
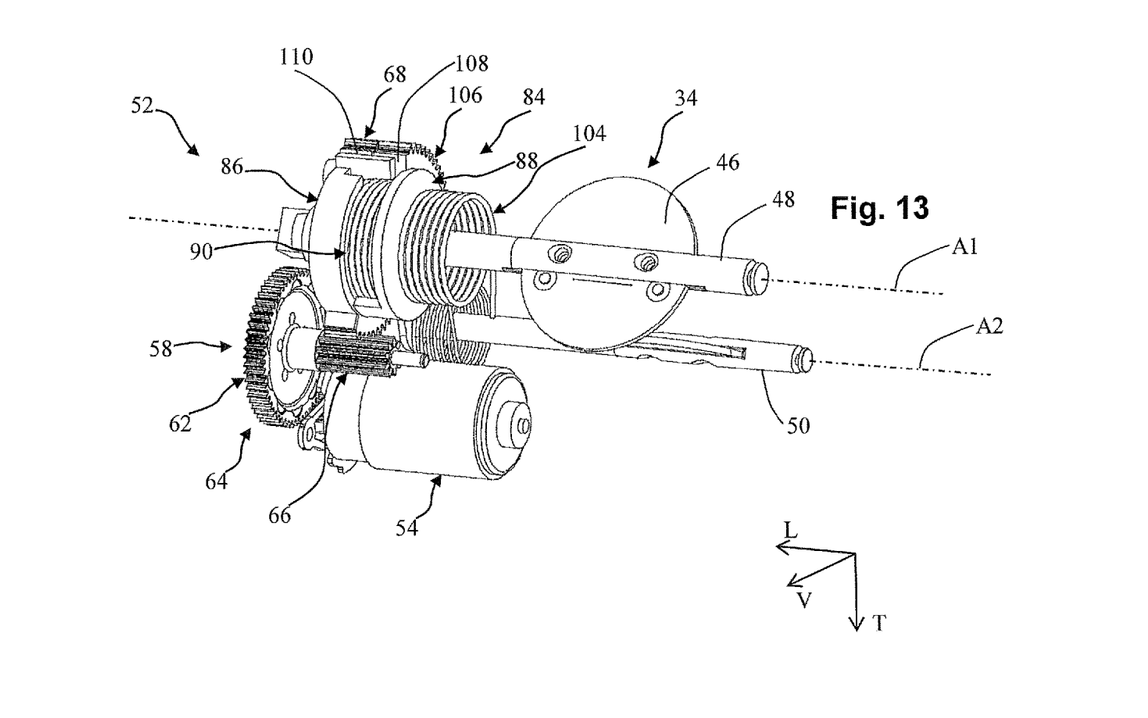
FIG. 13 is a similar view to FIG. 6 showing the actuating mechanism of FIG. 12.
Figure 14:
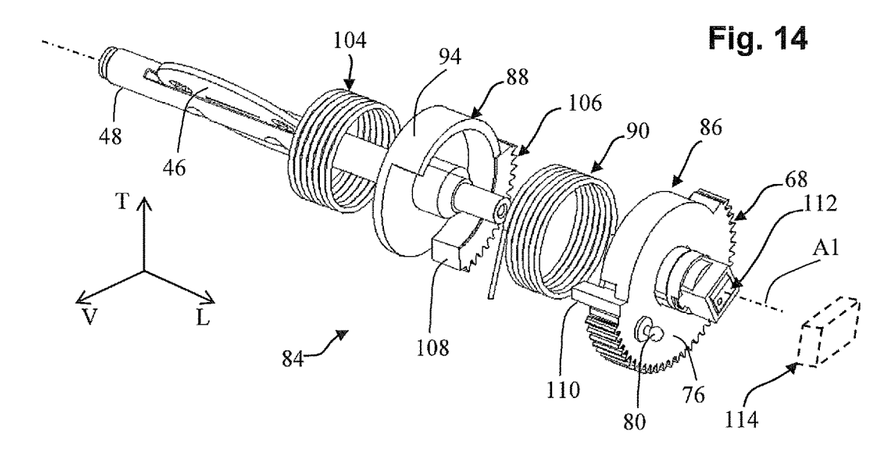
FIG. 14 is a similar view to FIG. 7 showing the rotary phase shifter mechanism of FIG. 12.
Figure 15:
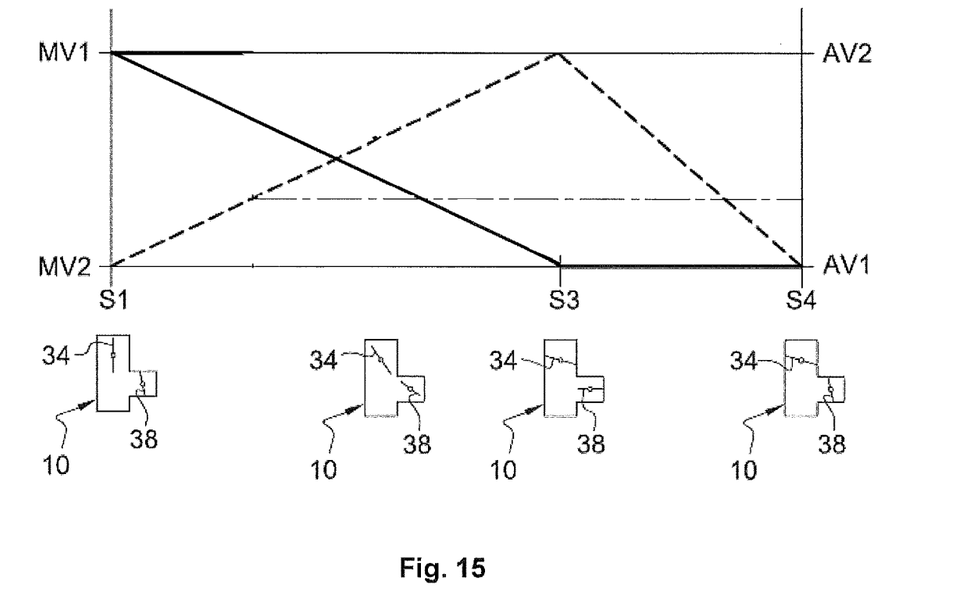
FIG. 15 is a similar diagram to FIG. 8 illustrating in three different stages the operation of the throttle valve assembly according to the second embodiment of the invention.

According to the example embodiment shown, more particularly on FIGS. 12 and 14, a rotating part, here a magnet 112, is mounted on the first pivoting member 86. A sensor 114, which can be mounted on a portion of the valve housing 40, is able to detect the angular orientation of the magnet 112 and to generate an electronic signal representative of the first pivoting member 86 angular position.

Between first stage S1 and the third stage S3, the angular position of the first pivoting member 86 corresponds to the angular position of the main throttle valve 34 and of the auxiliary throttle valve 38. Between the third stage S3 and the fourth stage S4, the angular position of the first pivoting member 86 corresponds to the closed position MV2 of the main throttle valve 34 and to the angular position of the auxiliary throttle valve 38.

Of course, other types of angular sensors 114 could be used.

It has to be noted that, as for the first embodiment, the rotating actuator 54 is controlled in only one rotational direction from the first stage S1 to the last stage S4 while providing opening and closing of the auxiliary throttle valve 38 and, in parallel, closing of the main throttle valve 34. The auxiliary throttle valve 38 is opened and then closed without need for reversing the rotational direction of the rotating actuator 54. The corresponding return springs 82, 104 provide the return force to pivot the valves 34, 38 back to their original angular position of the first stage S1 (main throttle valve 34 fully opened and auxiliary throttle valve 38 fully closed).

On the way back, the end-stop arrangement including the abutment surface 108 and the stop surface 110 causes the main throttle valve 34 to re-open and the engagement of the intermediate gear member 64 with the supplementary toothed sector 106 ensures same relative angular position between the first pivoting member 86 and the second pivoting member 88.

The first stage S1 corresponds to an unpowered position of the rotating actuator 54 and the fourth stage S4 corresponds to a fully powered position of the rotating actuator 54.

Thanks to the arrangement of the invention, including the mechanical link (the crank mechanism 70) between the two throttle valves 34, 38, an accurate relationship between the sensor 114 output and the effective angular position of the throttle valves 34, 38 is ensured preventing hysteresis effect.

The invention claimed is:

1. A throttle valve assembly for an internal combustion engine comprising:
    a valve housing having a main channel and an auxiliary channel connected to the main channel,
    a main throttle valve pivotally mounted in the main channel between a fully open position (MV1) and a closed position (MV2), said main throttle valve having a main pivoting shaft extending along a main axis (A1),
    an auxiliary throttle valve pivotally mounted in the auxiliary channel between a closed position (AV1) and a fully open position (AV2), said auxiliary throttle valve having an auxiliary pivoting shaft extending along an auxiliary axis (A2),
    a common rotating actuator controlling the opening angle of both the main throttle valve and the auxiliary throttle valve through an actuating mechanism, said actuating mechanism providing a time shift between the pivoting motions of both throttle valves during actuation of the rotating actuator,
    characterized by said actuating mechanism comprising a crank mechanism connected between the auxiliary pivoting shaft and a gear train driven by the rotating actuator such that, depending on the rotational motion provided by the rotating actuator, the auxiliary throttle valve is first actuated from its closed position (AV1) to its fully open position (AV2) and secondly actuated from its fully open position (AV2) to its closed position (AV1), without need for reversing the rotation direction of the gear train.

2. A throttle valve assembly according to claim 1 characterized by said crank mechanism comprising a crank attached to the auxiliary shaft and controlled by a lever connected to the gear train.

3. A throttle valve assembly according to claim 1 characterized by said actuating mechanism comprising a rotary phase shifter mechanism mounted on the main shaft and connected to the rotating actuator through the gear train such that, depending on the rotational motion provided by the rotating actuator, the main throttle valve is first actuated from its fully open position (MV1) to its closed position (MV2) and secondly maintained in its closed position (MV2) until the auxiliary throttle valve goes back to its closed position (AV2).

4. A throttle valve assembly according to claim 3 characterized by said rotary phase shifter mechanism comprising:
    a first pivoting member rotatably driven by the gear train,
    a connecting spring fitted in between the main shaft and the first pivoting member,
    such that, depending on the rotational motion provided by the rotating actuator:
    successively the first pivoting member rotates and engages the connecting spring, driving the main shaft in rotation together with the main throttle valve which rotates from its fully open position (MV1) to its closed position (MV2),
    and then the first pivoting member rotates with regards to the main shaft, loading the connecting spring, the main throttle valve remaining in its closed position (MV2).

5. A throttle valve assembly according to claim 4 characterized by a toothed sector being made of one piece with the first pivoting member, said toothed sector meshing with said gear train.

6. A throttle valve assembly according to claim 3 characterized by said rotary phase shifter mechanism comprising a second pivoting member connected in a rotationally rigid manner to the main shaft, a supplementary toothed sector being attached to the second pivoting member, said supplementary toothed sector meshing with said gear train only from the fully open position (MV1) to the fully closed position (MV2) of the main throttle valve.

7. A throttle valve assembly according to claim 6 characterized by said second pivoting member having an abutment surface and said first pivoting member having a stop surface, said connecting spring biasing the abutment surface towards the stop surface.

8. A throttle valve assembly according to claim 4 characterized by said rotary phase shifter mechanism comprising an arrangement allowing the main throttle valve to remain in its fully open position (MV1) while the auxiliary throttle valve is actuated from its closed position (AV1) to an intermediate open position (AV3) by the rotating actuator.

9. A throttle valve assembly according to claim 4 characterized by said connecting spring having a first end connected with a rotational shift to the first pivoting member and a second end connected in a rotationally rigid manner to the main shaft such that, depending on the rotational motion provided by the rotating actuator, the first pivoting member is able to rotate without engaging the connecting spring, the main throttle valve remaining in its fully open position (MV1).

10. A throttle valve assembly according to claim 9 characterized by said rotary phase shifter mechanism comprising a second pivoting member connected in a rotationally rigid manner to the main shaft, said first and said second pivoting members having substantially complementary tubular shapes coaxial with the main axis (A1), said second pivoting member being received into said first pivoting member and said connecting spring being mounted in the tubular housing defined by said first and second pivoting members, said connecting spring second end being attached to said second pivoting member, and said first pivoting member having a notch in its tubular surface for engaging said connecting spring first end with a rotational shift.

11. A throttle valve assembly according to claim 4 characterized by said crank mechanism being hinged on said first pivoting member.

12. A throttle valve assembly according to claim 4 characterized by an angular sensor arranged on the valve housing and cooperating with a rotating part arranged on said first pivoting member.

13. A throttle valve assembly according to claim 1 characterized by at least one return spring biasing the main throttle valve towards its fully open position (MV1) and biasing the auxiliary throttle valve towards its closed position (AV1).

14. A throttle valve assembly according to claim 1 characterized by said main axis (A1) being substantially parallel to said auxiliary axis (A2).

* * * * *